United States Patent [19]

Iwatani

[11] 3,756,415

[45] Sept. 4, 1973

[54] DEVIATION-CORRECTING MEANS FOR A FILTER MEDIUM

[75] Inventor: Akitoshi Iwatani, Marugame, Japan

[73] Assignee: Ishigaka Kiko Co., Ltd., Tokyo, Japan

[22] Filed: Oct. 20, 1971

[21] Appl. No.: 190,955

[30] Foreign Application Priority Data
Apr. 12, 1971 Japan.............................. 46/23247

[52] U.S. Cl. ................................ 210/401, 74/241
[51] Int. Cl. ........................................ B01d 33/14
[58] Field of Search .......................... 210/400, 401; 74/241

[56] References Cited
UNITED STATES PATENTS
3,069,921 12/1962 Davis .............................. 210/401 X FOREIGN PATENTS OR APPLICATIONS
39/29934 12/1964 Japan................................ 210/401

Primary Examiner—Frank A. Spear, Jr.
Assistant Examiner—T. A. Granger
Attorney—Dawson, Tilton, Fallon & Lungmus

[57] ABSTRACT

A deviation-correcting means for a filter medium in a filtering machine employing an endless and travelling-type filter medium, wherein plural numbers of filter medium-supporting rolls are provided around a rotating shaft, said rolls become in contact with the filter medium one after another with the rotation of said rotating shaft and are displaced selectively into a direction of correcting the deviation of the filter medium and said supporting rolls are further supported slidably on the way thereof by at least one supporting device in the form of a collar, which is fixedly mounted on the rotating shaft, whereby the rolls are prevented from being bent by gravity or the tension of the filter medium so as to avoid the causing of wrinkles in the filter medium.

2 Claims, 10 Drawing Figures

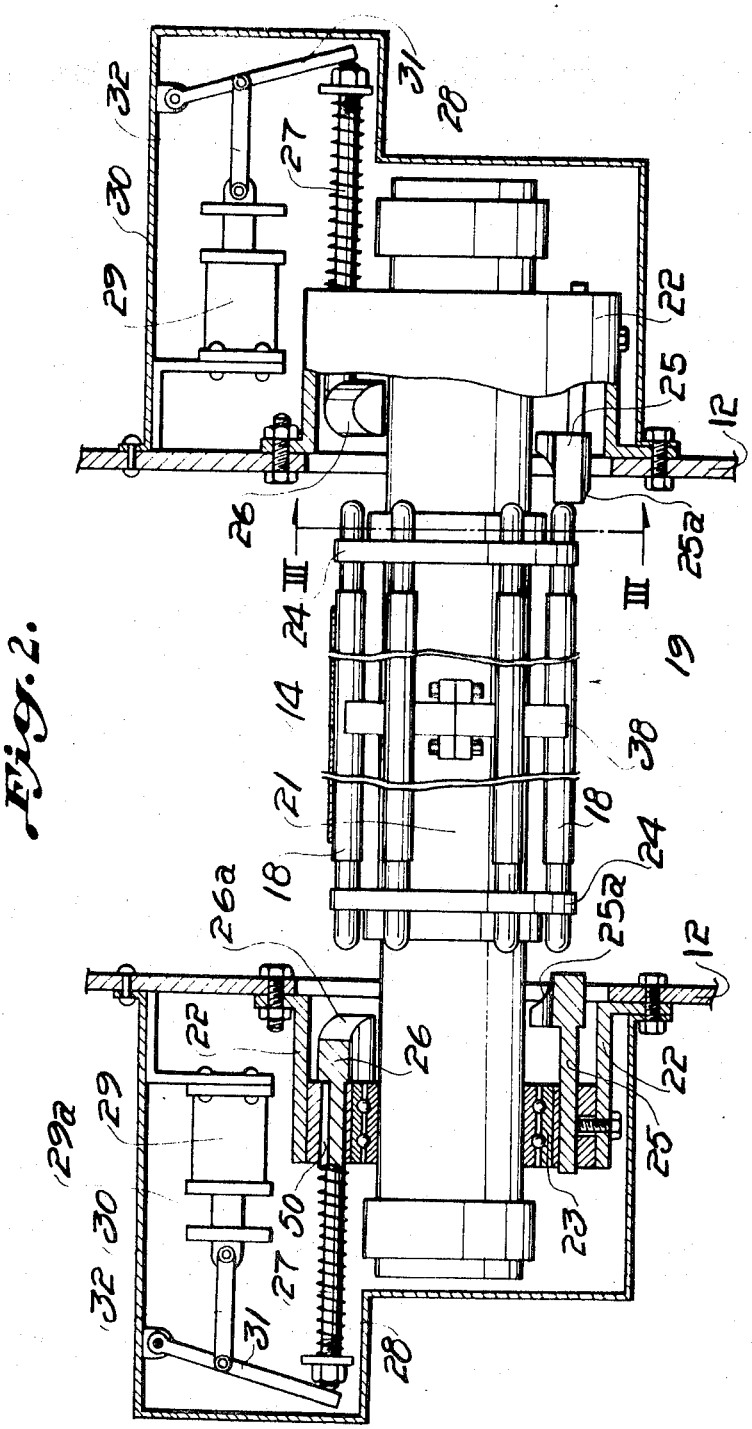

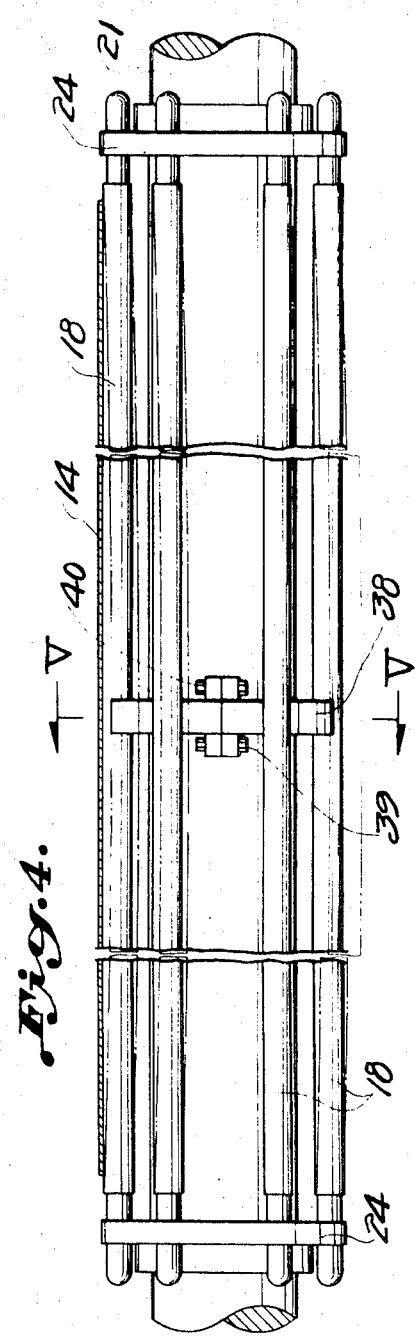
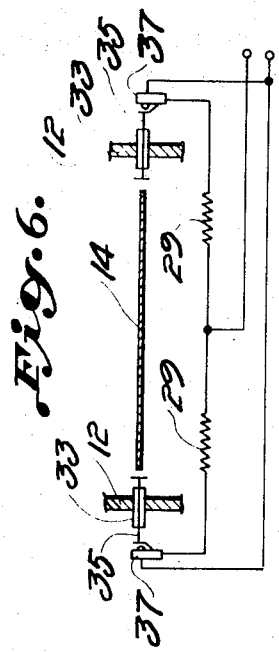
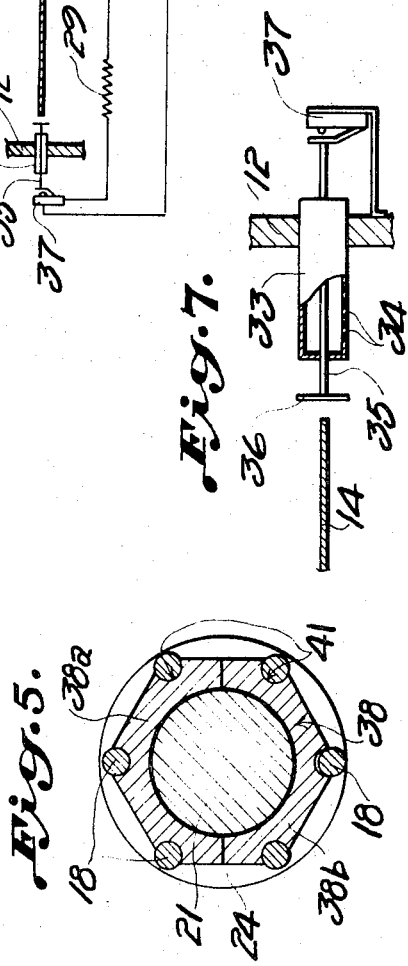

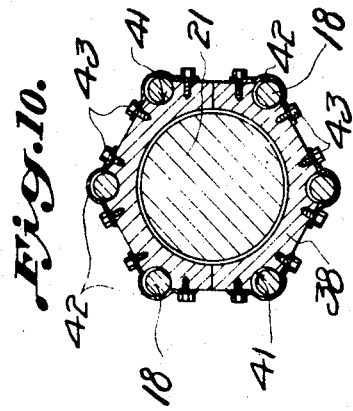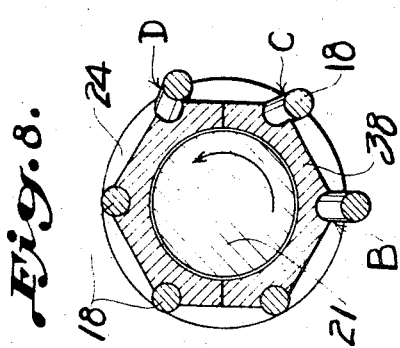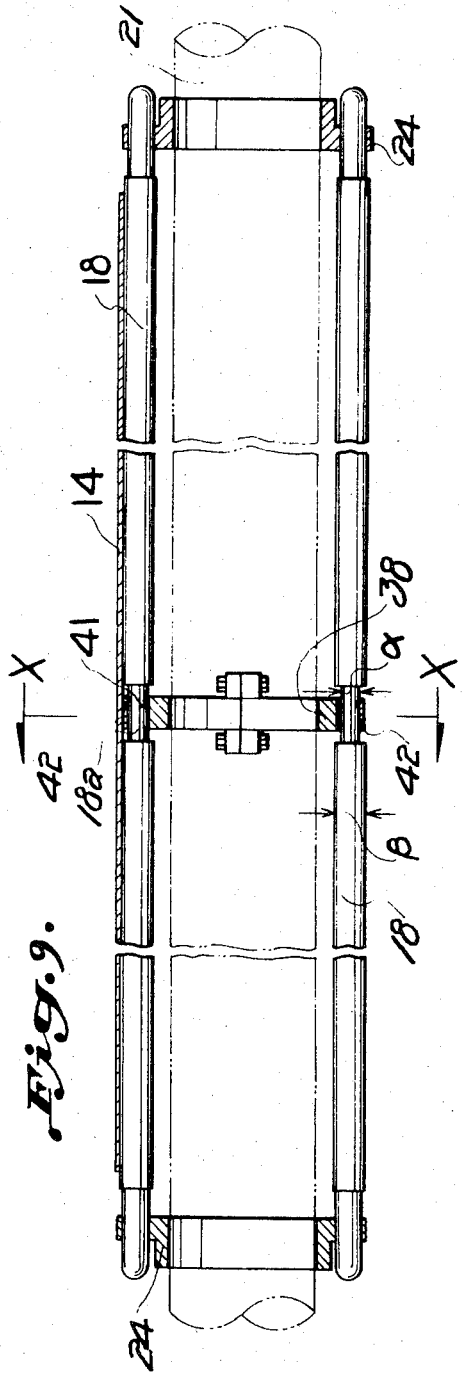

DEVIATION-CORRECTING MEANS FOR A FILTER MEDIUM

This invention relates to an improved deviation-correcting means for a filter medium in a filtering machine, and more particularly to a deviation-correcting means for a filter medium in the form of an endless belt which is employed in a filtering machine and is to be travelled.

In a filtering machine of the type wherein there is employed a filter medium in the form of an endless belt which is to be travelled, there is required a deviation-correcting means which corrects the deviation of said filter medium so as to travel the same along a proper path. As an effective one of such deviation-correcting means for a filter medium, there is known the means which is shown in Japanese Patent Publication No. 29934/64. In said means, a rotating shaft rotatably mounted on the machine frame is fixedly provided with supporting members which support at least two filter medium-supporting rolls in such a manner that said rolls are arranged around the shaft in parallel relations with respect to said shaft with equal intervals therebetween and slidably along the shaft, whereby each of said rolls which becomes in contact with the filter medium one after another with the rotation of said shaft is slid so as to be moved selectively into a direction of correcting the deviation of the filter medium.

Said deviation-correcting means for an endless filter medium is simple in construction and smooth in operation. Said means, however, always requires the provision of the filter medium-supporting rolls and causes some troubles. That is, though the rolls are kept straight by providing the same with sufficiently large rigidity and supporting the same near the both ends thereof by means of a pair of the supporting members provided to the rotating shaft when the filter medium is not too large in width, the rolls tends to bend by gravity or by the tension of the filter medium to cause wrinkles in the filter medium when supporting rolls of large span are required due to the large width of the filter medium. Said wrinkles in the filter medium are already caused when the rolls have been bent slightly.

Accordingly, it is a primary object of the present invention to provide an improved deviation-correcting means for a filter medium in which the aforestated troubles or defects are fully avoided.

And another object of the present invention is to provide an improved deviation-correcting means for a filter medium which means is simple in construction and smooth in operation.

The deviation-correcting means for a filter medium in a filtering machine according to the present invention comprises a rotating shaft which is rotably mounted on the machine frame, supporting members which are fixedly provided to said shaft, plural numbers of filter medium-supporting rolls which are supported by said supporting members in such a manner that said rolls are arranged around the shaft in parallel relations with respect to said shaft and slidably along the shaft whereby each of said rolls becomes in contact with the filter medium one after another with the rotation of the shaft, a detecting device which detects the deviation of the filter medium, a displacing means which displaces each of said supporting rolls by receiving signal from said detecting device so as to slide the concerned roll selectively into a direction of correcting the deviation of the filter medium, a returning means which returns each of thus displaced rolls to its original position and at least one supporting device in the form of a collar which is fixedly mounted on the rotating shaft and supports each of said supporting rolls on the way thereof slidably by receiving a portion of each roll with concaves formed at the periphery of said device. Said supporting device supports the filter medium-supporting rolls so as not to be bent by gravity, tension of the filter medium or the like even when the span of each supporting roll is pretty large, whereby the supporting rolls supports and guides the medium properly without causing wrinkles in the medium.

When a filtering machine becomes larger in scale and consequently filter medium-supporting rolls having still larger spans are required, the diameter of a portion of said each supporting roll which portion is received by said each concave of the collar-like supporting device is made smaller than the diameter of the other portion of the roll and the former portion is loosely embraced in said concave by a band in the form of an arc which is secured to said supporting device at the both ends thereof. Thus, the supporting rolls never get away out of the concaves of the supporting device whereby troubles caused by the employment of especially long supporting rolls are fully avoided.

The invention will be described in more detail, by way of example, with reference to the accompanying drawings, in which:

FIG. 2 is a front elevational view, partially cut away and partially in section, of an embodiment of the deviation-correcting means for a filter medium according to the present invention;

FIG. 4 is an enlarged front elevational view, partially cut away, of a part of the deviation-correcting means shown in FIG. 2;

FIG. 5 is a sectional view taken along line V—V of FIG. 4;

FIG. 6 is a diagrammatic view, partially in section, of the detecting device employed in the deviation-correcting means shown in FIG. 2;

FIG. 7 is an enlarged view of a part of the detecting device shown in FIG. 6;

FIG. 8 is a sectional view similar to FIG. 5 but showing a state where some troubles are caused;

FIG. 9 is an enlarged vertical sectional view, partially cut away, similar to FIG. 4 but showing a part of the deviation-correcting means for a filter medium according to an another embodiment of the present invention; and FIG. 10 is a sectional view taken along line X—X of FIG. 9.

Figure 1:
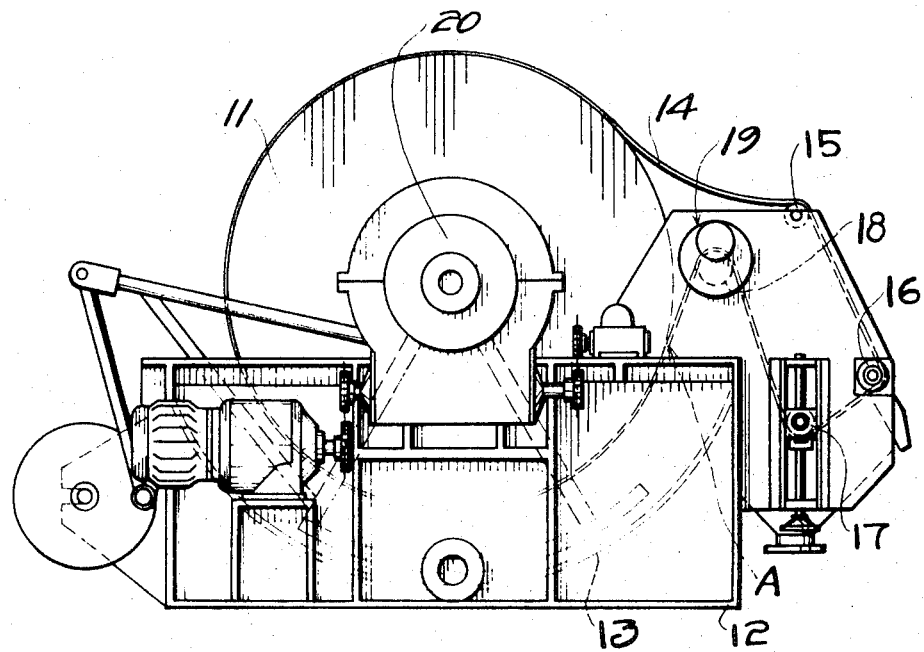
FIG. 1 is a side elevational view of a rotary drum vacuum filter in which the deviation-correcting means for a filter medium according to the present invention is employed.
Figure 3:
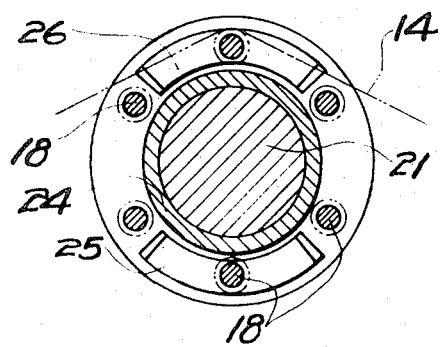
FIG. 3 is a sectional view taken along line III—III of FIG. 2.

Referring now to the drawings, in which like numerals designate like parts throughout the several views thereof, there is shown in FIGS. 1 through 7 an embodiment of the deviation-correcting means for a filter medium according to the present invention which is employed in a rotary drum vacuum filter. The rotary drum vacuum filter shown in FIG. 1 includes a rotary drum 11 suitably mounted for rotation in the machine frame 12 and driven by a suitable drive mechanism, a slurry tank 13 in which the lower portion of the drum 1 is immersed, and a filter medium 14 in the form of an endless belt which is entrained over the drum 11, a first or su-supporting roll 15, a cake-discharging roll 16, a tension-providing roll 17 and one of supporting rolls 18 provided in the deviation-correcting means 19 for said filter medium 14 and is travelled with the rotation of the drum 11. The filter medium 14 is a network or sheet endless belt of a woven fabric, wire gauze or the like through which purified liquid can permeate and said belt 14 covers the whole width of the surface of the drum 11. As is usual, the drum 11 is provided with a number of surface filtering chambers (not shown in the drawings) each of which is subjected to vacuum applied through conduits (not shown) connected to a filter valve 20 which operates in known fashion to apply controlled vacuum to the drum surface filtering chambers during rotation of the drum 11.

In the deviation-correcting means 19, there is provided a rotating shaft 21 which is rotably mounted on the machine frame 12 through casings or frame members 22 and bearings 23. To said rotating shaft 21 are fixedly provided a pair of collar-like supporting members 24 which support the aforestated filter medium-supporting rolls 18 in such a manner that the rolls 18 are arranged around the shaft 21 in parallel relations with respect to said shaft and slidably along the shaft 21. As shown in FIGS. 2 and 4, the ends of each supporting roll 18 are projected outwardly from the supporting members 24 by an equal length respectively. The shaft 21 is rotated by a suitable driving mechanism (not shown) so that each of the filter medium-supporting rolls 13 becomes in contact with the filter medium 14 so as to support the same one after another with the rotation of the shaft 21.

As shown in FIG. 2, a pair of fixed cams 25 are secured to the casings or frame members 22 in face to face relation to the ends of the supporting rolls 18. The cam face 25a of each of said fixed cams 25 has a spiral portion so that the cams 25 move each supporting roll 18 to slide along the shaft 21 into a predetermined position when the right or left end of each of the rolls 18 becomes in engagement with the right or left cam 25 one after another with the rotation of the shaft 21. That is, the cams 25 act as a returning means which returns each of the supporting rolls 18, which has been displaced by a displacing means hereinafter stated so as to correct the deviation of the filter medium 14, to its original position after the concerned roll has left the medium 14.

As shown in FIG. 2, there are provided in the deviation-correcting means 19 a pair of movable cams 26 which are slidably received or supported by the casings or frame members 22 through supporting rods 27 which are prevented from rotation by a sliding key 50. The cam faces 26a of said movable cams 26 have spiral portions similar to the ones of the fixed cams 25 and are in face to face relation to the ends of the filter medium-supporting roll 18 which supports the filter medium 14. The movable cams 26 are usually positioned by the force of springs 28 at waiting positions shown in FIG. 2 where the cam faces 26a are apart from the ends of the supporting rods 18. When a deviation of the filter medium 14 is resulted, the right or left movable cam 26 is moved selectively to project toward the filter medium-supporting rolls 18 so that the cam face 26a of said cam acts on the end of each of the supporting rolls 18 which become positioned in face to face relation to the movable cams 26 one after another, whereby each of the rolls 18 is slid to displace along the shaft 21 by a desired distance so as to correct the deviation of the filter medium 14 to aid in maintaining proper alignment of the same on the drum 11. Each of the movable cams 26 is moved against the force of the spring 28 by a solenoid 29 secured to a bracket 30 projected from the machine frame 12 through an operating lever 31, which is pivotally connected to the bracket 30 at one end and is operatively engaged to the end of the cam rod 27 at the other end, and a connecting rod 32 which connects the movable iron core 29a of the solenoid 29 and the lever 31 operatively. So, the movable cams 26 and the operating means for said cams including the solenoids 29 act as a displacing means which displaces each of the filter medium-supporting rolls 18, by receiving signal from a detecting device which will be detailed hereinafter, so as to slide the concerned roll selectively into a direction of correcting the deviation of the filter medium 14 when the roll supports or is in contact with the medium 14.

In the deviation-correcting means shown, there is provided at the position A shown in FIG. 1 a detecting device shown in FIGS. 6 and 7 which device detects the deviation of the filter medium 14. Said detecting device includes a pair of pipes 33 which are positioned at the both sides of the filter medium 14 with being supported by the machine frame 12. Each of the pipes 33 is closed at both ends and has suitable numbers of perforations 34 at the lower wall. A pair of detecting rods 35 are slidably received by the pipes 33, respectively. Each of said detecting rods 35 has a detecting plate 36 at one end which plate is faced to each side end of the filter medium 14 at a predetermined interval therebetween and the other end of each rod 35 is faced to a microswitch 37 which is electrically connected to the respective solenoids 29 as shown in FIG. 6. So, when the filter medium 14 is deviated into the right or left direction above a distance, the right or left solenoid 29 is operated due to the closing of the right or left micro-switch so that the right or left movable cam 26 is advanced, whereby each of the filter medium-supporting rolls 18 is displaced into the left or right direction so as to correct said deviation of the filter medium 14.

In this connection, the distance of the sliding movement of each movable cam 26, the shape of the cam face 26a of said movable cam 26 and therefore the distance of the sliding displacement of each filter medium-supporting roll 18, and the area or distance where each movable cam 26 is engaged with the end of each filter medium-supporting roll 18 are predetermined so that each supporting roll is displaced into the left or right direction when said supporting roll 18 is in contact with or supports the filter medium 14, whereby the deviation of the filter medium 14 is corrected continuously. Thus displaced supporting rolls 18 are returned to the original position by the fixed cams 25 after the rolls 18 have left the filter medium 14, as detailed before.

When the filter medium 14 is not too large in width, the filter medium-supporting rolls 18 are always kept straight by providing the same with sufficient rigidity and by supporting the same near the both ends thereof by means of the aforestated supporting members 24. However, when the supporting rolls 18 of larger span are required due to the larger width of the filter medium 14, the rolls 18 tend to bend by gravity or by the tension of the filter medium 14 to cause wrinkles in the filter medium. For avoiding said trouble, there is fixedly mounted on the rotating shaft 21 a supporting device 38 in the form of a collar. If required, plural numbers of such supporting devices 38 are mounted on the shaft 21 on the way thereof.

As shown in FIGS. 2, 4 and 5, the supporting device 38 is composed of two members 38a and 38b able to be divided and said members 38a and 38b are combined by means of bolts 39 and nuts 40 whereby they are secured to the shaft 21. Further, in this embodiment, there are provided six filter medium-supporting rolls 18 so that the supporting device 38 is formed into a hexagon and each corner of said hexagon is provided with a concave 41 by which a portion of each supporting roll 18 is rotatably received. The concaves 41 are formed at such positions that each roll 18 is kept straight in a parallel relation with respect to the rotating shaft 21 when the roll 18 reaches the uppermost revolving position where the medium 14 is supported by said roll.

Therefore, each supporting roll 18 for the filter medium is properly supported at a middle portion thereof by the supporting device 38 when the roll 18 supports or receives the filter medium 14, so that each supporting roll 18 is never bent by gravity, tension of the medium 14 or the like as shown with imagined line in FIG. 4 whereby the roll 18 supports and guides the medium 14 properly without causing wrinkles in the medium 14. Further, by employing the supporting device according to this embodiment, a large rigidity over a large span of each supporting roll 18 is never required, so that material of the roll 18 itself may be saved whereby the roll 18 can be prepared with a low cost and into a light one.

The supporting device 38 gives the above stated advantages and avoids the defects stated at the beginning at least once. However, when the filtering machine becomes larger in scale and filter medium-supporting rolls having larger spans are required, the following troubles are further resulted. That is, when the width of the filter medium 14 employed in the vacuum filter shown in FIG. 1 becomes as large as seven or eight meters, the filter medium-supporting rolls 18 become bent, as far as a sufficiently large rigidity is not given to the rolls 18 by enlarging the diameters of the rolls 18 to a great extent, downwardly apart from the concave 41 of the supporting device 38 near the center of the roll 18, as shown in FIG. 8, when said roll 18 reaches the lowermost revolving position B shown in FIG. 8 where the roll is never supported by the supporting device 38 and further the supporting roll 18 is not received properly by the concave 41 and, as shown in FIG. 8, runs on the periphery 38c of the supporting device 38 at revolving positions C and D even when the shaft 21 has been rotated toward the direction shown with an arrow.

In such a case, especially provided supporting device 38 becomes of no use. For avoiding this defect, it is considered that the concaves 41 are made deeper. In this case, however, there is resulted a trouble that the supporting device 38 becomes in contact with the filter medium 14. Accordingly, the second embodiment aims at the avoidance of these troubles.

In the second embodiment shown in FIGS. 9 and 10, the diameter of a portion of each supporting roll 18 which portion is supported by the supporting device 38, namely the diameter of a portion 18a of said roll 18 which portion is rotably engaged with each receiving portion or concave 41 of the supporting device 38 is especially made somewhat smaller into $\alpha$ over a desired width than the diameter $\beta$ of the other portion of the roll 18 which portion receives the filter medium. Each concave 41 of the supporting device 38 is so formed that each supporting roll 18 is kept straight in a parallel relation with respect to the rotating shaft 21 properly when said portion 18a having smaller diameter is engaged with the concave 41. Further, said portion 18a of each supporting roll 18 is loosely embraced by a band 42 of steel in the form of an arc, which is secured to the supporting device 38 at the both ends by screws 43, in such a manner that the supporting roll is slidable by a desired distance and rotable.

Preferably, the thickness of the steel band 42 is so made that the total diameter of the smaller portion 18a and said thickness is equal to the diameter $\beta$ of the roll 18 or slightly smaller than said diameter $\beta$.

Therefore, in this embodiment, each supporting roll 18 which is supported at a suitable portion thereof by the supporting device 38 is always received or supported at the lowermost revolving position so as not to hang down even when the span of said roll 18 is very large. So, supporting rolls having large spans may be obtained with small diameter, small weight and low preparation cost and without any fear of causing the aforedetailed troubles.

In the aforementioned embodiments of the present invention, each of the filter medium-supporting rolls 18 is displaced selectively to slide into a direction of correcting the deviation of the filter medium 14 by the displacing means or movable cams 26 when the roll 18 supports or is in contact with the medium 14, and thus displaced supporting roll 18 is returned to its original position by a returning means or fixed cams 25 after the concerned roll has left the filter medium 14. However, as can be easily understood now, the device may also be constructed in such a manner that each of the filter medium-supporting rolls 18 is displaced into the direction of the deviation of the filter medium 14 by the displacing means or movable cams 26 when said roll is in no contact with or apart from the filter medium 14, and then said roll is returned to its original position by the returning means or fixed cams 25 so as to correct the deviation of the filter medium 14 when the concerned roll 18 is in contact with or supports the filter medium 14.

Having now described the invention and having exemplified the manner in which it can be carried into practice, it is apparent to those skilled in the art that innumerable variations, applications, modifications and extensions of the basic principles involved may be made without departing from the spirit of the present invention. The invention is, therefore, to be limited only by the scope of the appended claims.

I claim:

1. In a filtering machine having a frame, an endless and traveling-type filter medium, and a shaft rotatably mounted on the frame, a deviation-correcting means for the filter medium comprising at least two support members secured to the shaft, a plurality of filter-medium supporting rolls extending parallel to the shaft and being circumferentially spaced about the shaft, each of the supporting rolls being rotatably supported by the support members and being slidable axially relative to the shaft, and a support collar secured to the shaft intermediate the ends of the supporting rolls, the support collar having an outer periphery positioned radially inwardly from a circle defined by the outermost point of each of the supporting rolls, the outer periphery of the support collar being provided with a plurality of concave recesses, each of the supporting rolls being received in one of the concave recesses whereby an intermediate portion of each supporting roll is supported by the support collar during at least a portion of the rotation of the shaft and the filter medium may be supported by the supporting rolls without contacting the support collar.

2. The structure of claim 1 in which each of the supporting rolls has at least two filter-supporting portions and a collar portion between adjacent filter-supporting portions, the collar portion of each supporting roll being received in a recess of the support collar and having a diameter less than the diameter of the filter-supporting portions, a support band for each recess secured to the support collar and extending over the collar portion of the supporting roll received in the recess, the axial dimension of each support band being less than the axial dimension of the associated collar portion whereby the supporting rolls can move axially relative to the support bands, the thickness of each support band being less than the difference between the radius of the filter-supporting portion and the radius of the collar portion of the associated supporting roll whereby the filter medium may be supported by the supporting rolls without contacting the support collars.

* * * * *